US009155092B2

(12) United States Patent
Park et al.

(10) Patent No.: US 9,155,092 B2
(45) Date of Patent: Oct. 6, 2015

(54) METHOD FOR TERMINAL TO CONTROL TIMING ADVANCE GROUP IN A WIRELESS COMMUNICATION SYSTEM, AND DEVICE FOR SAME

(75) Inventors: Sungjun Park, Anyang-si (KR); Sungduck Chun, Anyang-si (KR); Sunyoung Lee, Anyang-si (KR); Seungjune Yi, Anyang-si (KR); Sunghoon Jung, Anyang-si (KR); Youngdae Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 14/123,420

(22) PCT Filed: Jul. 3, 2012

(86) PCT No.: PCT/KR2012/005274
§ 371 (c)(1),
(2), (4) Date: Dec. 2, 2013

(87) PCT Pub. No.: WO2013/005972
PCT Pub. Date: Jan. 10, 2013

(65) Prior Publication Data
US 2014/0105192 A1 Apr. 17, 2014

Related U.S. Application Data

(60) Provisional application No. 61/504,245, filed on Jul. 4, 2011.

(51) Int. Cl.
*H04W 72/04* (2009.01)
*H04W 56/00* (2009.01)
*H04L 5/00* (2006.01)
*H04W 36/00* (2009.01)

(52) U.S. Cl.
CPC .......... *H04W 72/042* (2013.01); *H04L 5/0078* (2013.01); *H04W 36/0072* (2013.01); *H04W 56/00* (2013.01)

(58) Field of Classification Search
None
See application file for complete search history.

(56) References Cited

U.S. PATENT DOCUMENTS

| 9,002,354 | B2 * | 4/2015 | Krishnamurthy et al. . | 455/435.1 |
|---|---|---|---|---|
| 2011/0223903 | A1 * | 9/2011 | Michel et al. ............. | 455/422.1 |
| 2011/0228831 | A1 * | 9/2011 | Hirata ........................ | 375/224 |
| 2011/0243102 | A1 * | 10/2011 | Sebire et al. ............... | 370/336 |
| 2014/0133477 | A1 * | 5/2014 | Siomina et al. ............. | 370/350 |

FOREIGN PATENT DOCUMENTS

WO 2010-148404 A1 12/2010

OTHER PUBLICATIONS

R2-113014, "Multiple timing advance using multiple RACH", 3GPP TSG-RAN WG2 Meeting #74, May 9-13, 2011.
R2-111953, "The Multiple Timing Advances in Carrier Aggregation", 3GPP TSG-RAN WG2 Meeting #73bis, Apr. 11-15, 2011.
R2-100423, "Supporting Multiple timing advance groups", 3GPP TSG-RAN WG2 Meeting #68bis, Jan. 18-22, 2010.

* cited by examiner

*Primary Examiner* — Min Jung
(74) *Attorney, Agent, or Firm* — Dentons US LLP

(57) ABSTRACT

The present application discloses a method in which a terminal controls a timing group in a wireless communication system. Specifically, the method is characterized by comprising: a step for measuring the difference between the downlink timing of a specific serving cell and a reference cell; and a step for transmitting, via a network, a message requesting the change of a timing group, if the specific serving cell belongs to the same timing group as the reference cell and the measured downlink timing difference is at least a threshold value, or if the specific serving cell belongs to a different timing group to the reference cell and the measured downlink timing difference is less than the threshold value.

9 Claims, 19 Drawing Sheets

(a) Control-plane protocol stack (b) User-plane protocol stack

F1
F2

METHOD FOR TERMINAL TO CONTROL TIMING ADVANCE GROUP IN A WIRELESS COMMUNICATION SYSTEM, AND DEVICE FOR SAME

This application is a 35 U.S.C. §371 National Stage Entry of International Application No. PCT/KR2012/005274, filed Jul. 3, 2012 and claims the benefit of U.S. Provisional Application No. 61/504,245, filed Jul. 4, 2011, which is incorporated by reference in its entirety herein.

TECHNICAL FIELD

The present invention relates to a wireless communication system, and more particularly, to a method and apparatus for controlling a timing advance group at a user equipment (UE) in a wireless communication system.

BACKGROUND ART

As an example of a wireless communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for controlling a timing advance group at a user equipment (UE) in a wireless communication system.

Technical Solution

The object of the present invention can be achieved by providing a method of controlling a timing group at a user equipment (UE) in a wireless communication system including measuring a difference in downlink timing between a specific serving cell and a reference cell, and transmitting a timing group change request message to a network, if the specific serving cell belongs to the same timing group as the reference cell and the measured difference in downlink timing is equal to or greater than a threshold or if the specific serving cell belongs to a timing group different from that of the reference cell and the measured difference in downlink timing is less than the threshold.

The method may further include receiving a message for changing the specific serving cell to another timing group in response to the timing group change request message if the specific serving cell belongs to the same timing group as the reference cell and the measured difference in downlink timing is equal to or greater than the threshold.

The method may further include receiving a message for changing the specific serving cell to the same timing group as the reference cell in response to the timing group change request message if the specific serving cell belongs to a timing group different from that of the reference cell and the measured difference in downlink timing is less than the threshold.

The reference cell may be a primary serving cell. Alternatively, the reference cell may be a secondary serving cell configured by the network.

The method may further include receiving information about the threshold from the network.

In another aspect of the present invention, provided herein is a method of controlling a timing group at a user equipment (UE) in a wireless communication system including measuring a difference in downlink timing between a reference cell and a specific serving cell belonging to the same timing group as the reference cell, transmitting a random access preamble message to a network if the difference in downlink timing is equal to or greater than a threshold and receiving a random access response message including a timing correction value for the specific serving cell from the network.

The method may further include transmitting a timing group change request message of the specific serving cell to the network after applying the timing correction value and receiving a timing group change message for allocating the specific serving cell to a new timing group in response to the timing group change request message.

The method may further include applying uplink timing of the reference cell to uplink timing of the specific serving cell if the timing group change message is not received for a predetermined time after transmitting the timing group change request message.

Advantageous Effects

According to the embodiment of the present invention, a UE can more efficiently control a timing advance group in a wireless communication system to which a carrier aggregation (CA) scheme is applicable.

The effects of the present invention are not limited to the above-described effects and other effects which are not described herein will become apparent to those skilled in the art from the following description.

BEST MODE

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

Although, for convenience, the embodiments of the present invention are described using the LTE system and the LTE-A system in the present specification, the embodiments of the present invention are applicable to any communication system corresponding to the above definition.

Figure 1:
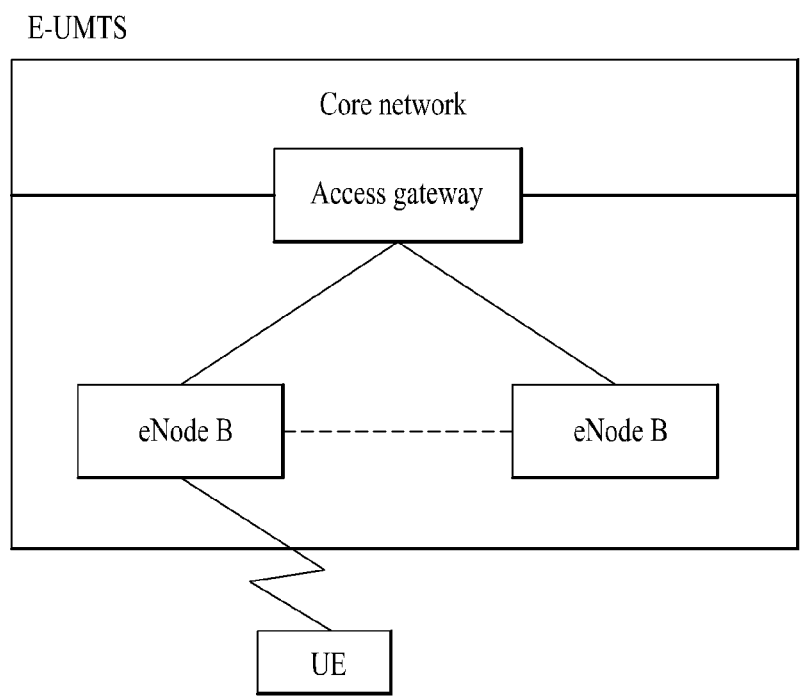
FIG. 1 is a diagram showing a network structure of an Evolved Universal Mobile Telecommunications System (E-UMTS) as an example of a wireless communication system.
Figure 2:
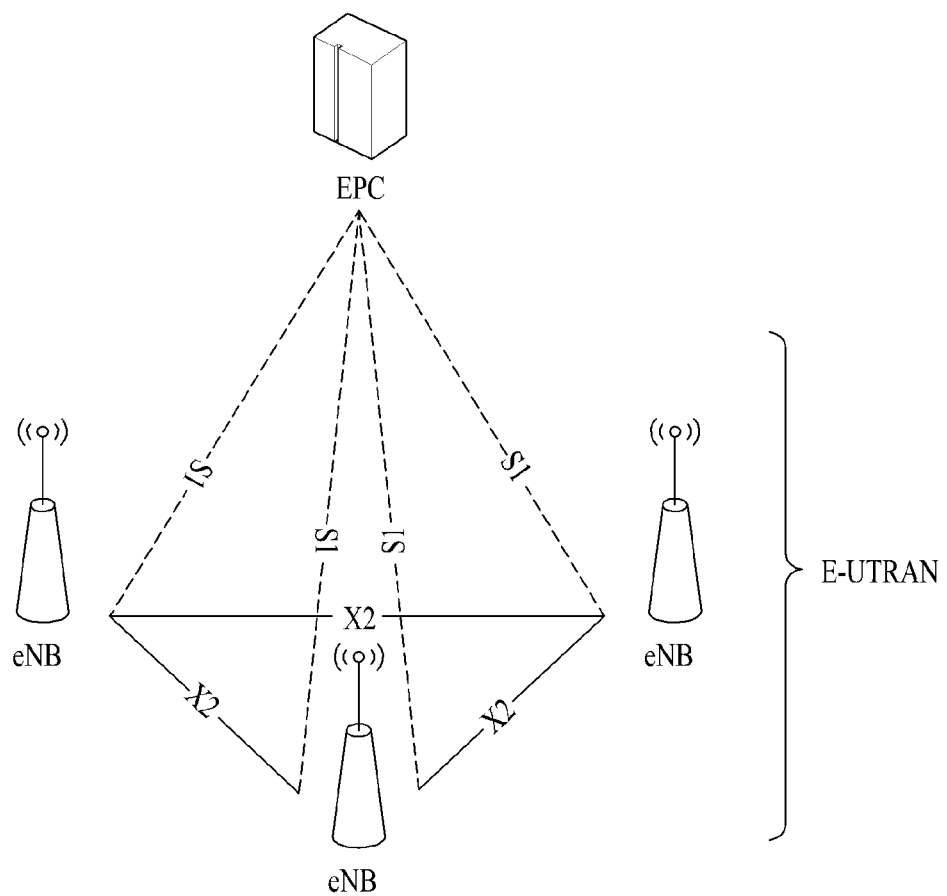
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
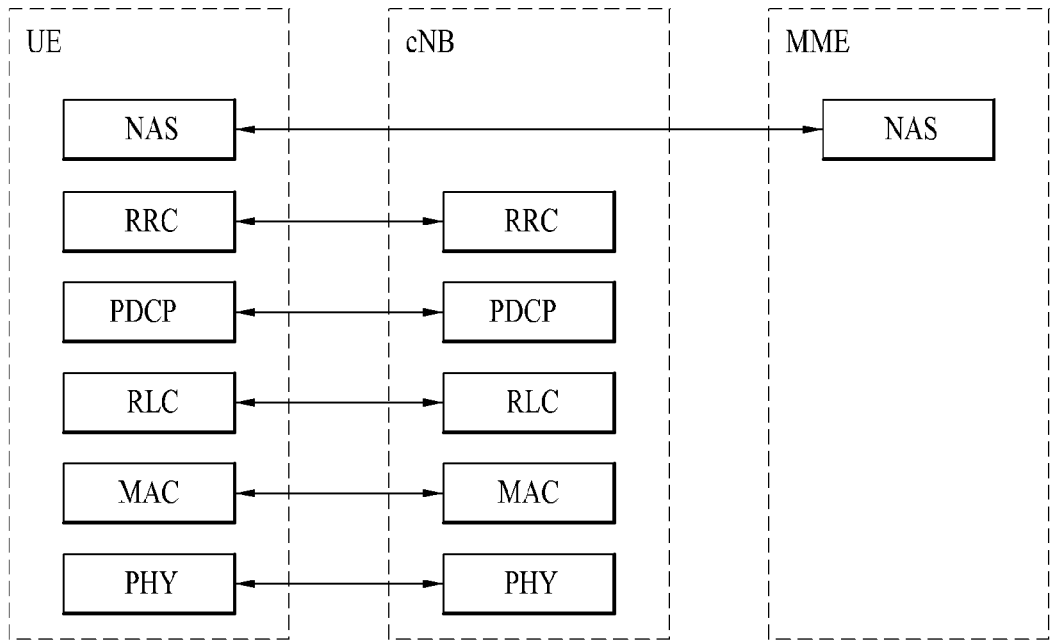
FIG. 3 is a diagram showing a control plane and a user plane of a radio interface protocol between a User Equipment (UE) and an Evolved Universal Terrestrial Radio Access Network (E-UTRAN) based on a $3^{rd}$ Generation Partnership Project (3GPP) radio access network standard.
Figure 3:
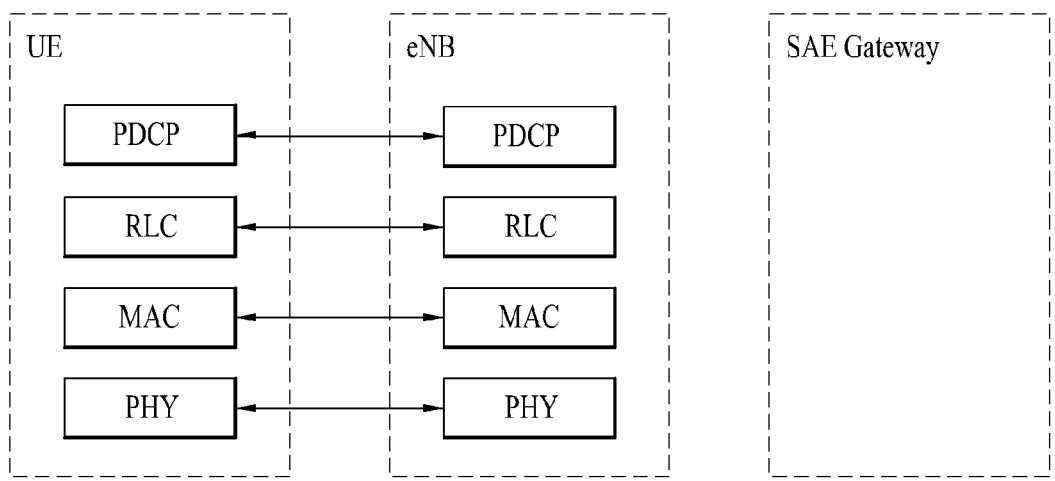

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
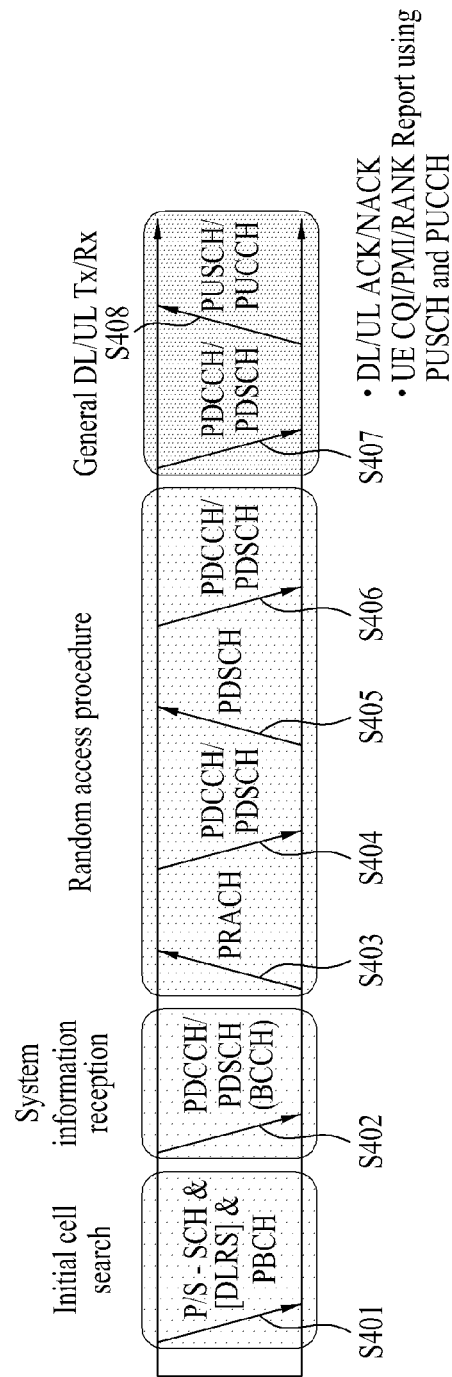
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
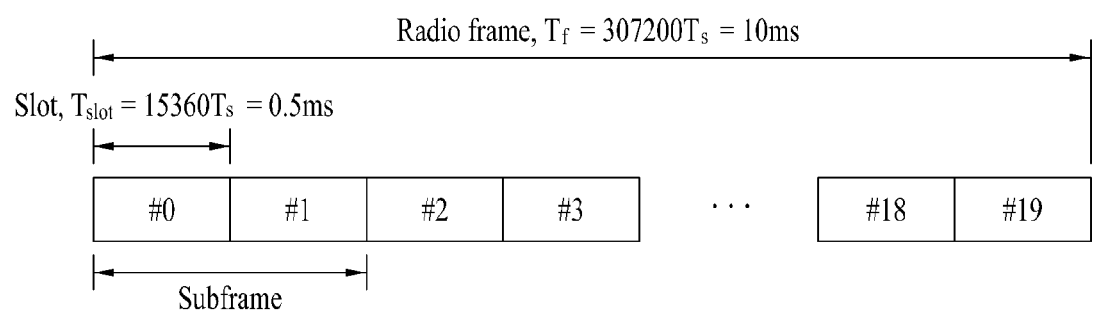
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, a random access procedure will be described in greater detail. The UE may perform a random access procedure in the following cases:

when the UE performs initial access because RRC connection with the eNB is not established, when the UE initially accesses a target cell in a handover procedure, when the random access procedure is requested by a command of a base station, when uplink data transmission is performed in a situation in which uplink time synchronization is not performed or in a situation in which specific radio resources used for requesting radio resources are not allocated, and when a recovery procedure is performed in case of a radio link failure or a handover failure.

In the LTE system, a non-contention based random access procedure of, at an eNB, allocating a dedicated random access preamble to a specific UE and, at the UE, performing the random access procedure using the random access preamble is provided. In other words, there are two procedures in selection of a random access preamble: one is a contention based random access procedure in which the UE randomly selects one preamble within a specific group for use, another is a non-contention based random access procedure in which a random access preamble allocated only to a specific UE by the eNB is used. The above-described random access procedures are performed differently in contention occurring due to competition, as will be described below. The non-contention based random access procedure may be used, as described above, only in the handover procedure or when the random access procedure is requested by the eNB.

In the contention based random access procedure, the UE randomly selects one random access preamble from a set of random access preambles indicated via system information or a handover command and selects and transmits PRACH resources for transmitting the random access preamble.

The UE attempts to receive a random access response thereof within a random access response reception window indicated by the eNB via system information or a handover command, after transmitting the random access preamble. More specifically, the random access response information is transmitted in the form of a MAC PDU and the MAC PDU is delivered via a PDSCH. In addition, in order to enable the UE to appropriately receive the information delivered via the PDSCH, a PDCCH is also delivered. That is, the PDCCH includes information about the UE which will receive the PDSCH, frequency and time information of radio resources of the PDSCH and a transmission format of the PDSCH.

Once the UE has successfully received the PDCCH, the UE appropriately receives the random access response transmitted via the PDSCH according to the information about the PDCCH. The random access response includes a random access preamble identifier, uplink grant, a temporary cell identifier (C-RNTI) and timing advance commands (TACs). The reason why the random access preamble identifier is necessary is because random access response information for one or more UEs is included in one random access response and thus for which UE the uplink grant, temporary C-RNTI and TACs are valid should be indicated. The random access preamble identifier matches the random access preamble selected by the UE.

If the UE has received a valid random access response, the UE processes information included in the random access response. That is, the UE applies the TAC and stores the temporary C-RNTI. In addition, the UE transmits data stored in the buffer of the UE or newly generated data to the eNB using the uplink grant. The identifier of the UE is necessarily included in data included in the uplink grant. In the contention based random access procedure, the eNB cannot determine which UE performs the random access procedure. However, for future contention resolution, the UE should be identified. In addition, there are two methods including the identifier of the UE.

In the first method, if a UE has a valid cell identifier allocated by a cell before the random access procedure, the UE transmits a cell identifier thereof in uplink. In contrast, if the UE is not allocated a valid cell identifier before the random access procedure, the UE transmits a unique identifier (e.g., S-TMSI or random id). In general, the unique identifier is longer than the cell identifier. If the UE transmits data via the UL grant, a contention resolution timer starts.

The UE transmits data including the identifier thereof via the uplink grant included in the random access response and then waits for an instruction of the eNB for contention resolution. That is, in order to receive a specific message, the UE attempts to receive a PDCCH. The method of receiving the PDCCH includes two methods. As described above, if the identifier transmitted via the uplink grant is a cell identifier, the UE attempts to receive the PDCCH using the cell identifier and, if the identifier is a unique identifier, the UE attempts to receive the PDCCH using the temporary C-RNTI included in the random access response.

Thereafter, in the former case, if the PDCCH is received via the cell identifier before the contention resolution timer has elapsed, the UE determines that the random access procedure has been normally performed and completes the random access procedure. In the latter case, if the PDCCH is received via the temporary cell identifier before the contention resolution timer has elapsed, data delivered via the PDSCH indicated by the PDCCH is checked. If the unique identifier of the UE is included in the data, the UE determines that the random access procedure has been normally performed and completes the random access procedure.

Additionally, unlike the contention based random access procedure, in the non-contention based random access procedure, when the random access response information is received, the UE determines that the random access procedures has been normally performed and completes the random access procedure.

As described above, the non-contention based random access procedure may be performed in a handover process or when the random access procedure is requested by a command of the eNB. Of course, the contention based random access procedure may be performed in a handover process or when the random access procedure is requested by a command of the eNB. First, for the non-contention based random access procedure, it is important to receive, from the eNB, a predetermined random access preamble which does not cause contention. In the method of receiving the random access preamble, a handover command and a PDCCH command may be used. The UE receives the random access preamble allocated thereto from the eNB and then transmits the preamble to the eNB.

The method of receiving the random access response information is equal to that of the contention based random access procedure.

Hereinafter, a carrier aggregation (CA) scheme of an LTE-A system will be described.

Figure 6:
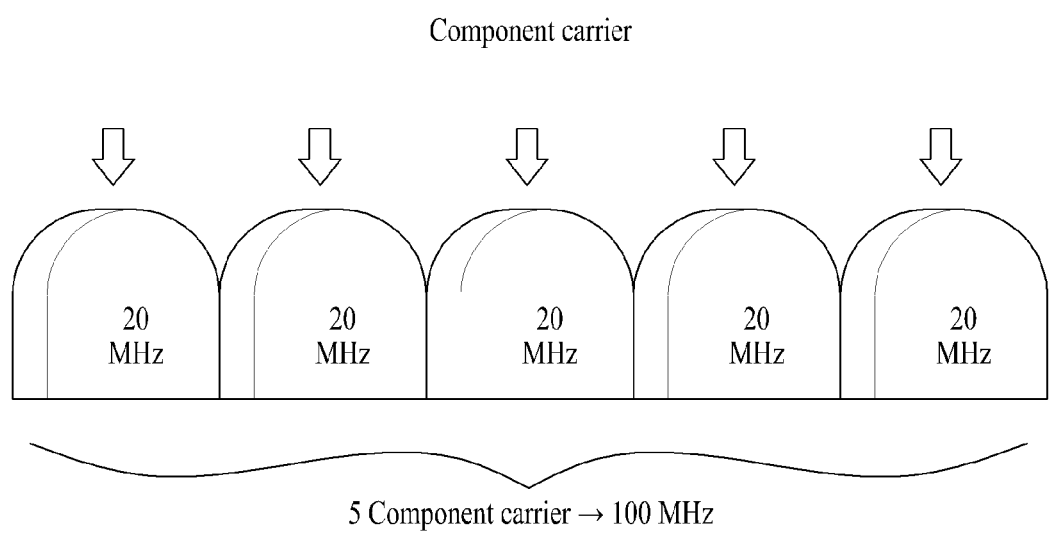
FIG. 6 is a diagram showing the concept of a carrier aggregation (CA) scheme of an LTE-A system.

FIG. 6 is a diagram showing the concept of a carrier aggregation (CA) scheme of an LTE-A system.

The LTE-A standard is a candidate of IMT-Advanced technology of the international telecommunication union (ITU) and is designed to satisfy requirements of IMT-Advanced technology of ITU. Accordingly, in LTE-A, in order to satisfy requirements of ITU, extension of bandwidth of an LTE system has been discussed. In order to extend bandwidth in the LTE-A system, a carrier of an LTE system is defined as a component carrier (CC) and a maximum of 5 CCs are combined and used. For reference, a serving cell may be composed of one downlink CC and one uplink CC. Alternatively, the serving cell may be composed of one downlink CC. Since the CC may have a maximum bandwidth of 20 MHz as in the LTE system, bandwidth may be extended to a maximum of 100 MHz. Technology for combining and using a plurality of CCs is referred to as CA.

If a CA scheme is applied, only one RRC connection is established between a UE and a network. Among a plurality of serving cells configured to be used by a UE, a serving cell for providing mobility information of a NAS layer and security input in order to establish or re-establish an RRC connection is referred to as a primary serving cell (PCell) and the other cells are referred to as secondary serving cells (SCells).

Figure 7:
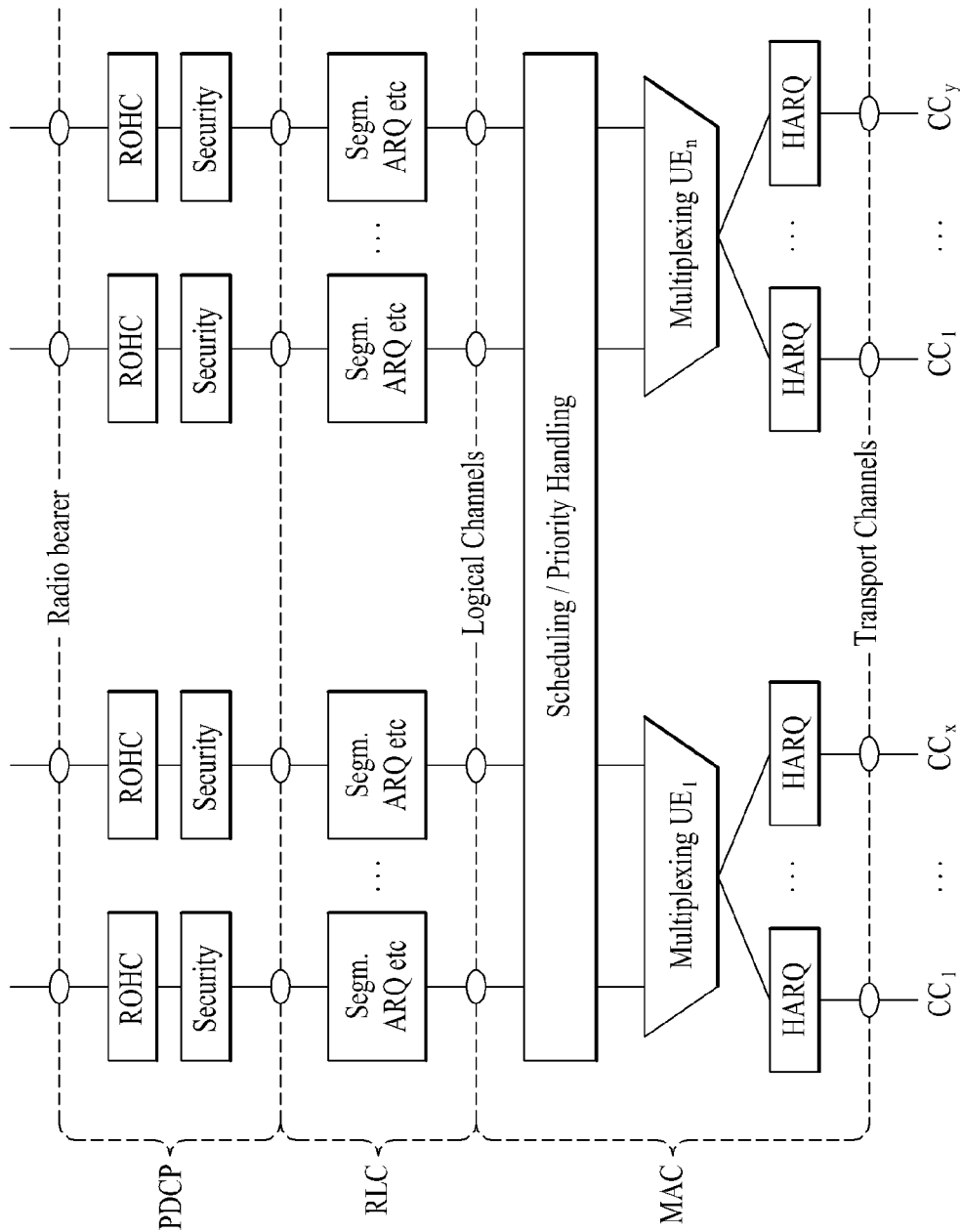
FIGS. 7 and 8 are diagrams showing the structure of a second downlink layer and a second uplink layer in case of applying a CA scheme.
Figure 8:
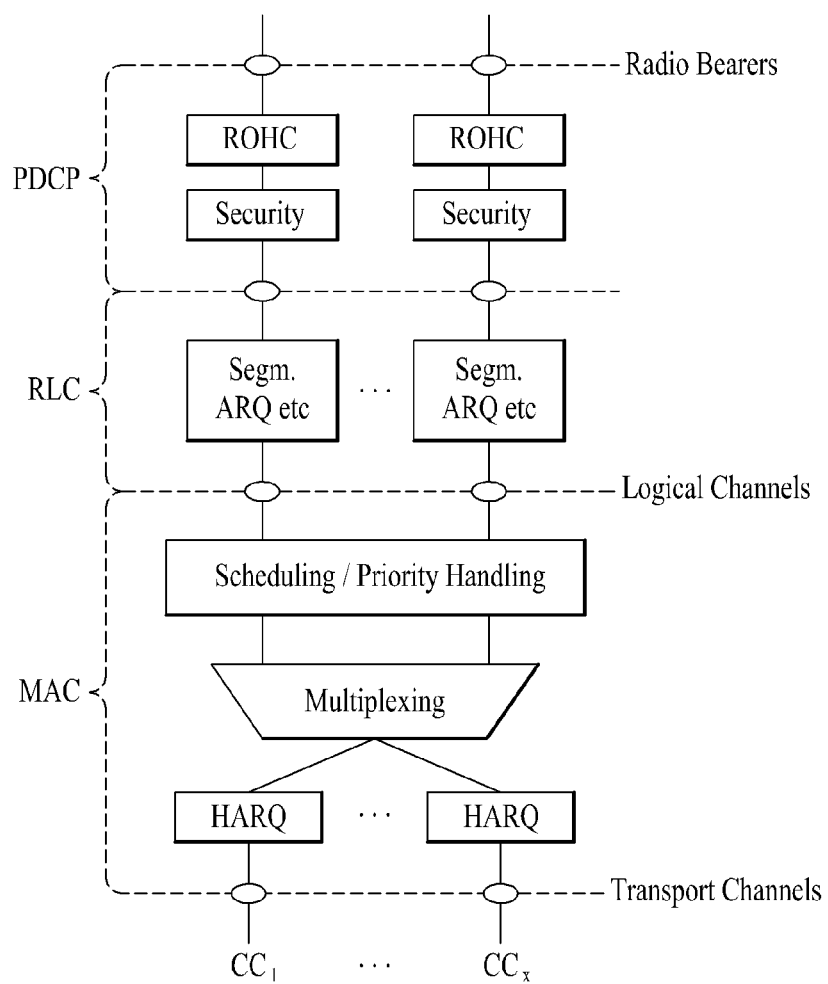

FIGS. 7 and 8 are diagrams showing the structure of a second downlink layer and a second uplink layer in case of applying a CA scheme.

Referring to FIGS. 7 and 8, the CA scheme influences a second layer and, more particularly, an MAC layer. For example, in CA, since a plurality of CCs is used and one HARQ entity manages one CC, an MAC layer of an LTE-A system should perform operations related to a plurality of HARQ entities. In addition, since transport blocks are independently processed, HARQ entities may transmit or receive a plurality of transport blocks at the same time via a plurality of CCs in CA.

Next, timing advance maintenance of uplink in an LTE system will be described.

In an OFDM based LTE system, a time when a signal transmitted by a UE reaches an eNB may change according to cell radius, a location of a UE within a cell and a speed of a UE. That is, unless an eNB manages transmission timing of each UE, a signal transmitted by the UE may interfere with a signal transmitted by another UE and thus a probability that errors occur in a signal received by the eNB is increased.

More specifically, a time when a signal transmitted by a UE located at a cell edge reaches an eNB is longer than a time when a signal transmitted by a UE located at a cell center reaches the eNB. In contrast, the time when the signal transmitted by the UE located at the cell center reaches the eNB is relatively shorter than the time when the signal transmitted by the UE located at the cell edge reaches the eNB.

Since the eNB should receive data or signals from all UEs within the cell for every valid time in order to prevent interference, the eNB should appropriately control transmission timing of the UE according to the state of the UE and such control is referred to as timing advance maintenance.

As one timing advance maintenance method, random access operation may be used. That is, the eNB receives a random access preamble from the UE via the random access operation and calculates a timing advance value for advancing or delaying transmission timing of the UE using the received random access preamble. The eNB signals the timing advance value to the UE via a random access response and the UE updates uplink transmission timing using the timing advance value.

As another method, the eNB periodically or randomly receives a sounding reference signal (SRS) from the UE, calculates the timing advance value of the UE via the received signal and signals the timing advance value to the UE. Thus, the UE updates the transmission timing thereof.

As described above, the eNB measures the transmission timing of the UE via the random access preamble or the SRS, calculates a timing value to be corrected and signal the timing value to be corrected to the UE. The timing advance value (that is, the timing value to be corrected) transmitted from the eNB to the UE is referred to as a timing advance command (TAC). The TAC is processed by an MAC layer. Since the UE is not fixed, the transmission timing of the UE is changed according to the speed and location of the UE.

Once the UE receives the timing advance command from the eNB, assume that the timing advance command is valid only for a specific time. Thus, a timing advance timer (TAT) is used. That is, when the UE receives the TAC from the eNB, the TAT starts. Only while the TAT operates, assume that the uplink timing of the UE matches that of the eNB. The value of the timing advance timer may be delivered via an RRC signal such as system information or radio bearer reconfiguration. In addition, if the UE has received a new timing advance command from the eNB while the TAT operates, the timing advance timer restarts. If the TAT has elapsed or if the TAT does not operate, the UE assumes that uplink timing of the UE does not match that of the eNB and does not transmit any uplink signal, e.g., a PUSCH and PUCCH signal except for the random access preamble.

In order to describe timing advance maintenance in a CA scheme, scenarios to which the CA scheme is applicable will be described.

FIGS. 9 to 13 are diagrams showing scenarios to which a CA scheme is applicable.

Figure 9:
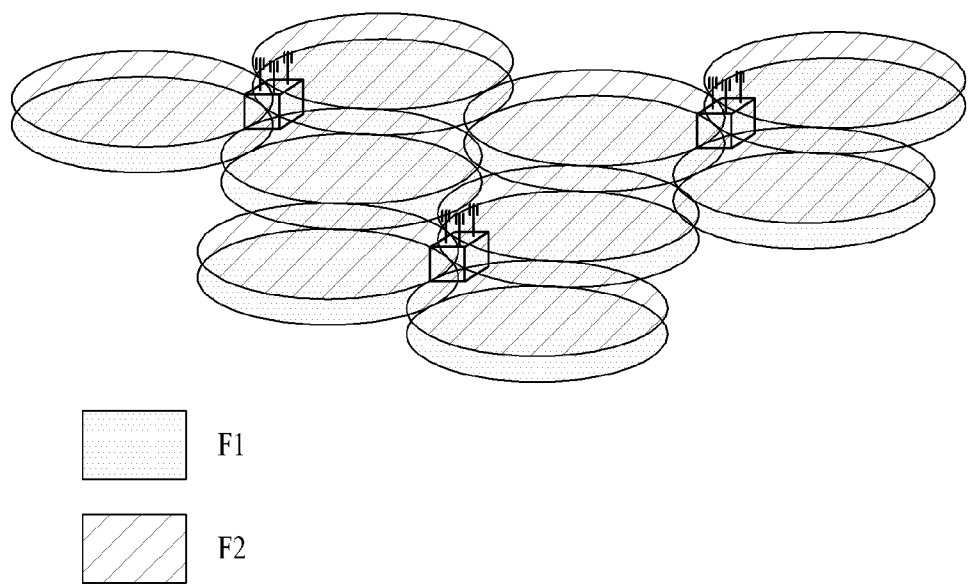
FIGS. 9 to 13 are diagrams showing scenarios to which a CA scheme is applied.

First, FIG. 9 shows a scenario in which an F1 cell and an F2 cell are configured at the same location and provide the same coverage and the F1 and F2 cells provide services with the same frequency bandwidth.

Figure 10:
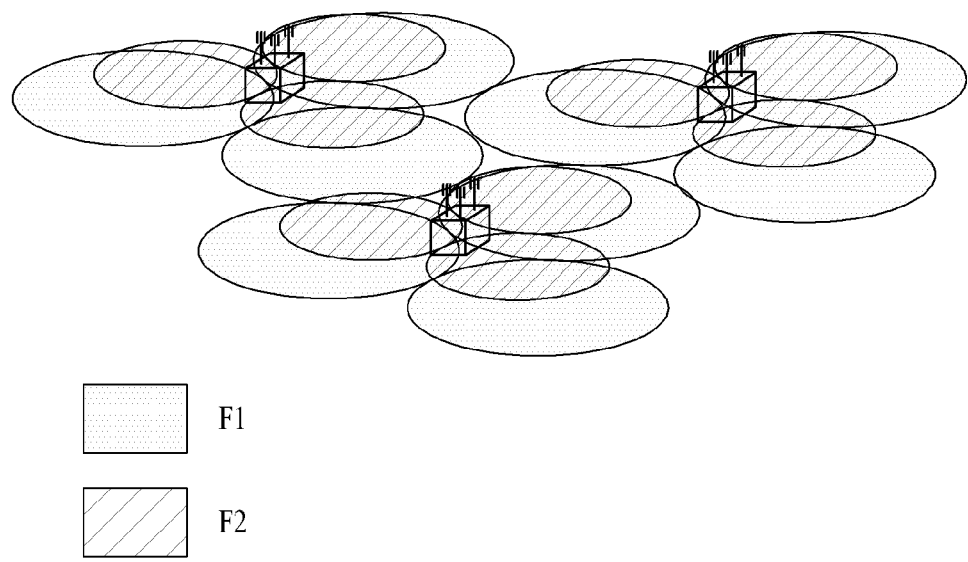

Next, FIG. 10 shows a scenario in which an F1 cell and an F2 cell are configured at the same location but the coverage of the F2 cell is less than that of the F1 cell due to large path loss. In this case, only the F2 cell provides sufficient coverage and the F2 cell may be used to increase throughput. Mobility is based on the coverage of the F1 cell and the F1 cell and the F2 cell provide services with different frequency bandwidths.

Figure 11:
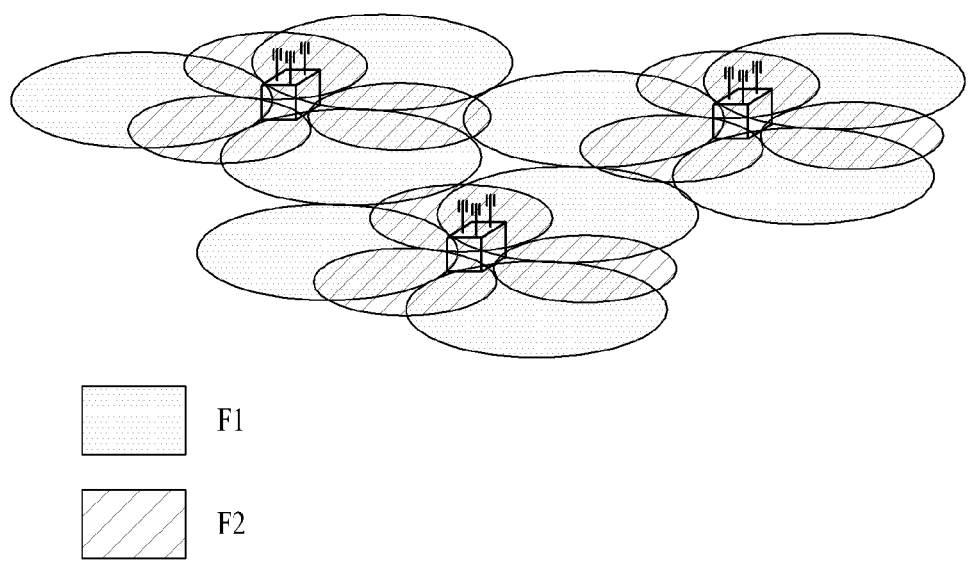

FIG. 11 shows a scenario in which an F1 cell and an F2 cell are configured at the same location but an antenna of the F2 cell is directed to a cell boundary of the F1 cell to increase throughput at the cell boundary. Similarly, mobility is based on the coverage of the F1 cell and the F1 cell and the F2 cell provide services with different frequency bandwidths.

Figure 12:
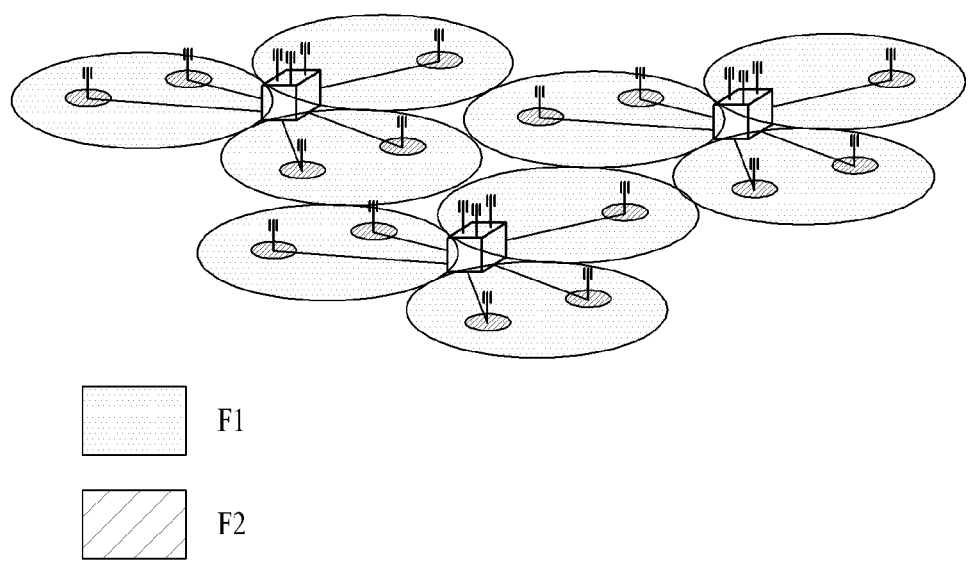
Figure 13:
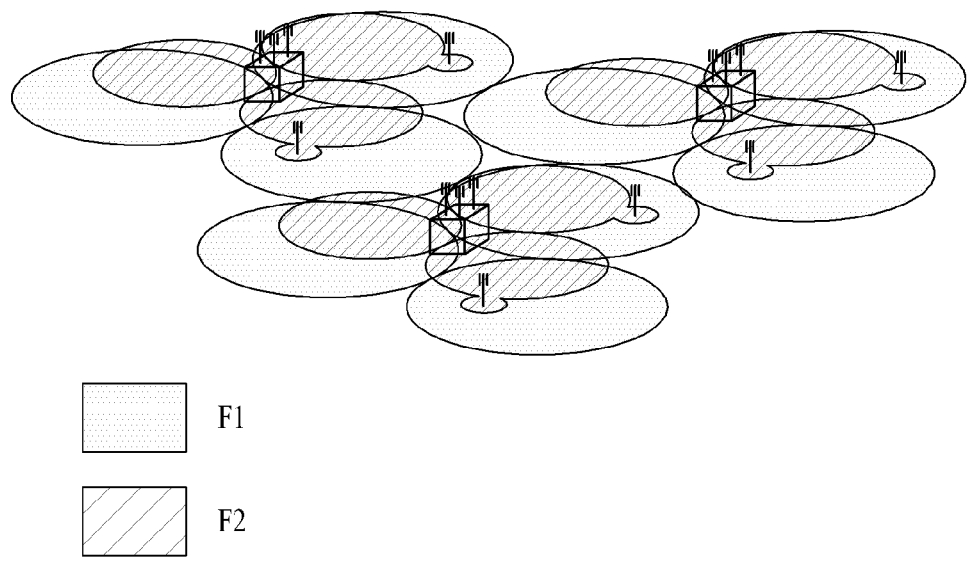

FIG. 12 shows a scenario in which an F1 cell is a macro cell and an F2 cell is a remote radio head (RRH) used to improve throughput at a hot spot. Mobility is based on the coverage of the F1 cell and the F1 cell and the F2 cell provide services with different frequency bandwidths. FIG. 13 is similar to FIG. 10 and shows a scenario in which a frequency selective repeater is established and coverage of a specific carrier frequency is extended.

Among scenarios to which the CA scheme is applied, the scenarios described with reference to FIGS. 10 to 13 require multiple timing advance maintenance.

Figure 14:
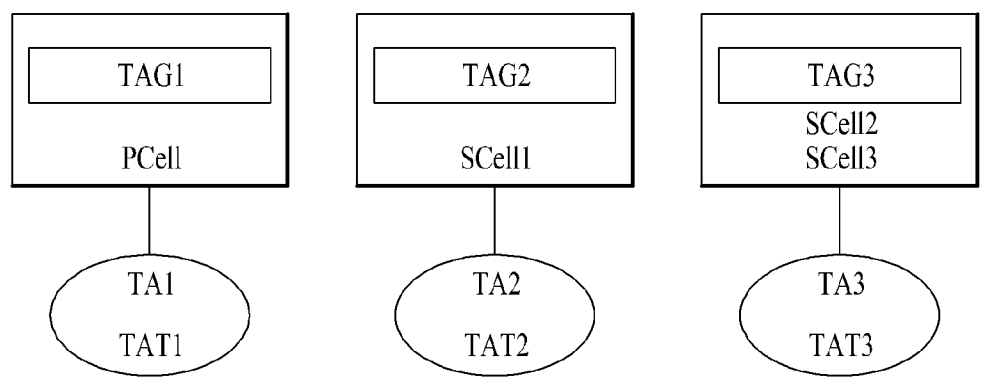
FIG. 14 is a diagram showing an example of managing timing advance in case of applying a CA scheme.

FIG. 14 is a diagram showing an example of maintaining timing advance in case of applying a CA scheme. In particular, FIG. 14 shows an example of configuring a timing advance group (TAG) according to similarity of timing advance change and applying timing advance maintenance to each TAG.

When a UE receives a timing advance command (TAC) from an eNB, a TAT starts. Assume that uplink timings of the UE and the eNB match each other only during operation of the TAT. As shown in FIG. 14, the UE using the CA scheme manages time synchronization per TAG and thus a TAT operates per TAG. That is, the same timing advance change is applied to all serving cells in the same TAG. If the TAT has expired, uplink transmission via the serving cell of the TAG, except for a random access preamble, is impossible.

A UE which uses a CA function by configuring a plurality of serving cells controls timing advance according to the following principles.

1) One timing reference cell for controlling uplink timing is present in each TAG and TAGs may have different TAT values.

2) A TAG including a PCell is referred to as a primary TAG (pTAG) and a TAG including only SCells without a PCell is referred to as a secondary TAG (sTAG).

3) Timing advance control of the pTAG is performed according to a timing advance control method of a legacy LTE system and a PCell becomes a reference cell.

4) When an SCell belonging to an sTAG first controls uplink timing, the SCell may start a random access procedure only by a command of an eNB. Although uplink transmission is necessary, it is not possible to start the random access procedure without the command of the eNB.

5) When the PCell and the SCell control uplink timing via the random access procedure, a non-contention based random access procedure is performed.

6) If a TAT of a PTAG does not operate, TATs of the other TAGs cannot operate.

When a plurality of timing advances in a UE is managed, although a TAG is configured in consideration of similarity of the timing advance change between the used serving cells, it is necessary to control the TAG according to circumstance.

For example, when the eNB enables the UE to use a new serving cell (SCell), a timing advance correction value of the new serving cell is different from that of an old TAG and thus a new TAG may be allocated. Alternatively, timing advance of a specific serving cell is not equal to timing advance of a currently configured TAG and thus the TAG needs to be changed to another TAG or a new TAG. Changing the TAG means changing the timing advance correction value of the serving cell. Therefore, there is a need for a mechanism for setting accurate timing advance as fast as possible after changing the TAG.

In order to enable control timing advance of a PCell, a random access procedure should be necessarily performed according to the command of the eNB. However, it is difficult for the eNB to rapidly determine whether the TAG needs to be changed with respect to the serving cells of all UEs. For example, in the situation of FIG. 13, it is difficult for the eNB to rapidly recognize all repeaters. Accordingly, if all TAGs are managed by only the eNB, uplink transmission is performed for a long time while timing advance is not adjusted and thus inter-cell interference may occur. In addition, even when an old TAG may be used, a new TAG may be allocated. That is, unnecessary timing advance maintenance may be performed. Therefore, there is a need for a mechanism for detecting a need for changing a TAG at a UE.

In the present invention, the eNB sets TAG information with respect to the UE and adds a serving cell to the TAG and the UE measures timing advance of the serving cell, compares the measured result with a predetermined threshold, determines that the TAG of the cell needs to be changed if the compared result satisfies a predetermined condition, and transmits information requesting to change the TAG of the serving cell.

Preferably, the eNB may add a serving cell or delete or change the configured serving cell with respect to the UE via an RRC connection reconfiguration process. In addition, the eNB may transmit TAG information to the UE via the RRC connection reconfiguration process in order to manage the TAG of the serving cell. The TAG information may include a TAT value and a TAG identifier.

More preferably, the UE may measure downlink timing of the serving cell in order to measure timing advance of the serving cell, that is, uplink timing. Further, the eNB may set the threshold to be used for measurement and comparison for determining whether the TAG needs to be changed at the UE via an RRC signal. Accordingly, the UE may determine whether the TAG of the specific serving cell needs to be changed using downlink timing and the threshold as follows.

1) The UE receives a primary synchronization signal (PSS) and a secondary synchronization signal (SSS) designed for downlink synchronization of each serving cell and measures downlink timing. The UE may measure downlink timing with respect to all serving cells or only serving cells configured by the eNB. If a difference in downlink timing between serving cells included in the same TAG is equal to or greater than a threshold as the measured result, the UE determines that the TAG of the serving cell needs to be changed with respect to the eNB.

2) If a difference in downlink timing between serving cells belonging to different TAGs is equal to or less than another threshold, the UE determines that the TAG of the serving cell needs to be changed with respect to the eNB. Upon comparison of downlink timing, the eNB may set one of serving cells as a reference cell and the UE may compare downlink timing differences. For example, if the PCell is set as a reference cell, the UE measures a difference in downlink timing between the PCell and an SCell belonging to the same TAG as the PCell or an SCell belonging to another TAG, compares the difference with the threshold, and determines whether the TAG needs to be changed.

In addition, if the UE determines that the TAG of the serving cell needs to be changed, a TAG change request message including one or more pieces of the following information may be transmitted to the eNB via a MAC signal or an RRC signal.

Frequency information or cell identifier of a considered cell
Frequency information or cell identifier of a reference cell
Difference in downlink timing between the considered cell and the reference cell
Downlink timing values of the considered cell and the reference cell, which are measured by the UE
New TAG request bits
Old TAG deletion request bit If the UE determines that the TAG of the serving cell needs to be changed, the random access procedure may be performed on the serving cell without the command of the eNB. For example, in the case in which it is assumed that the UE has one TAG and one PCell and one SCell are included in the TAG, if the difference in downlink timing measured by the UE is equal to or greater than the threshold, the UE may perform the random access procedure on the SCell without the command of the eNB, inform the eNB of the reason why the random access procedure is performed according to uplink grant included in a random access response, and request to change the TAG of the cell.

In addition, if the eNB adds a new serving cell to the UE and configures the serving cell to be included in a new TAG, the UE may perform the random access procedure on the serving cell. As a detailed method, an initiation request bit may be included in TAG information or serving cell information such that the UE performs the random access procedure on the serving cell. That is, the eNB determines whether the TAG of each serving cell needs to be changed and whether a random access procedure needs to be performed when changing the TAG and informs the UE of the determined result via an RRC signal. Even when a new serving cell is additionally configured, the eNB may determine whether a new TAG or an old TAG may be allocated to the serving cell and the UE may perform the random access procedure according to the request of the eNB, that is, the initiation request bit.

Figure 15:
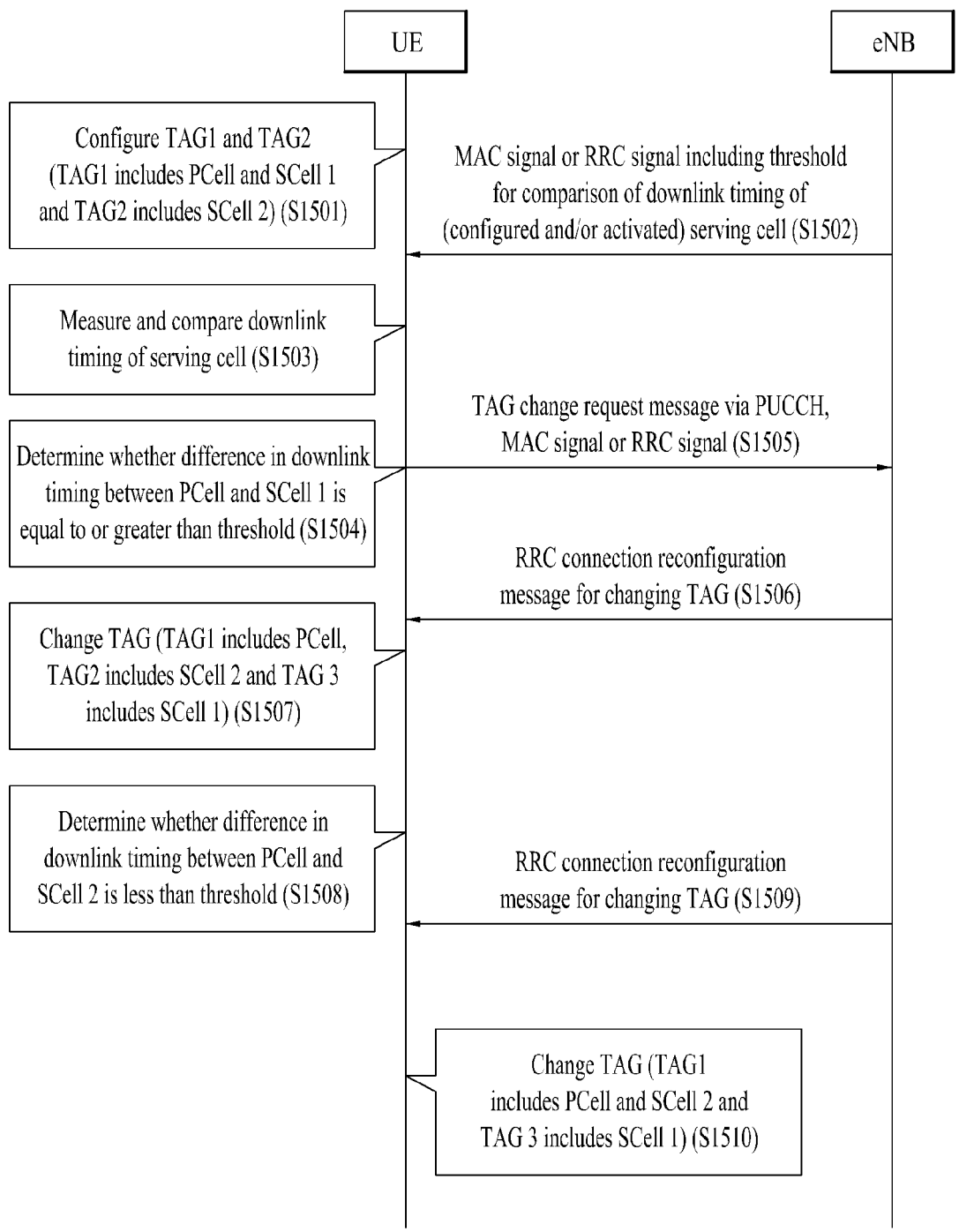
FIG. 15 is a diagram showing operation for controlling a timing advance group between a UE and an eNB according to an embodiment of the present invention.

FIG. 15 is a diagram showing operation for controlling a timing advance group between a UE and an eNB according to an embodiment of the present invention. In particular, FIG. 15 shows a method of changing a TAG of a serving cell to a new TAG or an old TAG.

Figure 16:
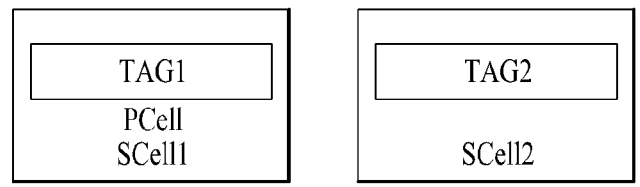
FIGS. 16 to 18 are diagrams showing examples of changing serving cells included in a timing advance group according to an embodiment of the present invention.
Figure 17:
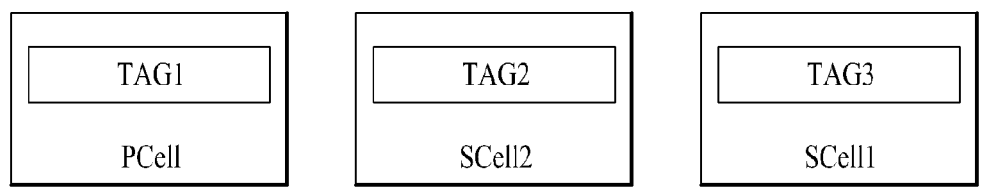
Figure 18:
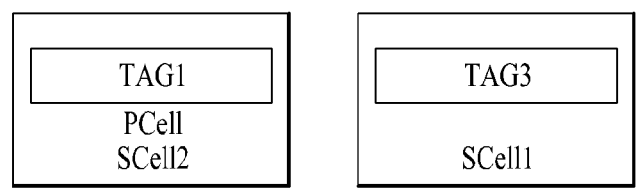

In addition, FIGS. 16 to 18 are diagrams showing examples of changing serving cells included in a timing advance group according to an embodiment of the present invention.

Referring to FIG. 15, assume that a UE configures two TAGs in step 1501. That is, in FIG. 15, TAG1 includes a PCell and an Scell 1 and TAG2 includes an Scell 2. More specifically, as shown in FIG. 16, the same TA1 value is applied to the PCell and the Scell 1 and a TA2 value is applied to the Scell 2.

An eNB transmits, to the UE, a threshold to be used for comparison of difference in downlink timing via a MAC signal or an RRC signal. The eNB also transmits, to the UE, information about a cell, the difference in downlink timing of which is compared. For example, differences in downlink timing of all or some of serving cells may be compared. At this time, the eNB informs the UE of a reference cell for comparison.

Next, the UE measures downlink timings of the serving cells, obtains differences between the timings of the serving cells and the timing of the reference cell, and compares the differences with the threshold in step 1503. Upon downlink timing measurement, signals PSS and SSS for the downlink timing received from the eNB may be used.

As described above, if a difference in timing correction value between serving cells in the same TAG is equal to or greater than a first threshold or if a difference in timing correction value between serving cells of different TAGs is equal to or less than a second threshold, the UE requests the eNB to change the TAG of the cell via a PUCCH, a MAC signal and an RRC signal. Here, the first threshold and the second threshold may be the same or different. In the following description, for convenience of description, assume that the first threshold and the second threshold are the same.

Accordingly, if it is determined the difference in downlink timing between the PCell and Scell 1 is equal to or greater than the threshold in step 1504, the UE transmits a TAG change request message to the eNB via a PUCCH, a MAC signal or an RRC signal in step 1505. The eNB, which has received the TAG change request message, transmits an RRC connection reconfiguration message including information for changing the TAG to the UE in step 1506.

The UE, which has received the RRC connection reconfiguration message, changes the TAG of the cell based on the RRC connection reconfiguration message in step 1507. In the present example, as shown in FIG. 17, the UE transmits a request for changing the TAG of the SCell 1 to the eNB and the eNB includes the SCell 1 in a new TAG (that is, TAG 3).

In addition, if it is determined that the difference in downlink timing between the PCell and the SCell 2 is equal to or less than the threshold in step 1508, the UE transmits a TAG change request message to the eNB via a PUCCH, a MAC signal or an RRC signal in step 1509. The eNB, which has received the TAG change request message, includes information for changing the TAG in the RRC connection reconfiguration message and transmits the RRC connection reconfiguration message to the UE in step 1509. Finally, the UE changes the TAG of the cell based on the RRC connection reconfiguration message in step 1510, as shown in FIG. 18.

Figure 19:
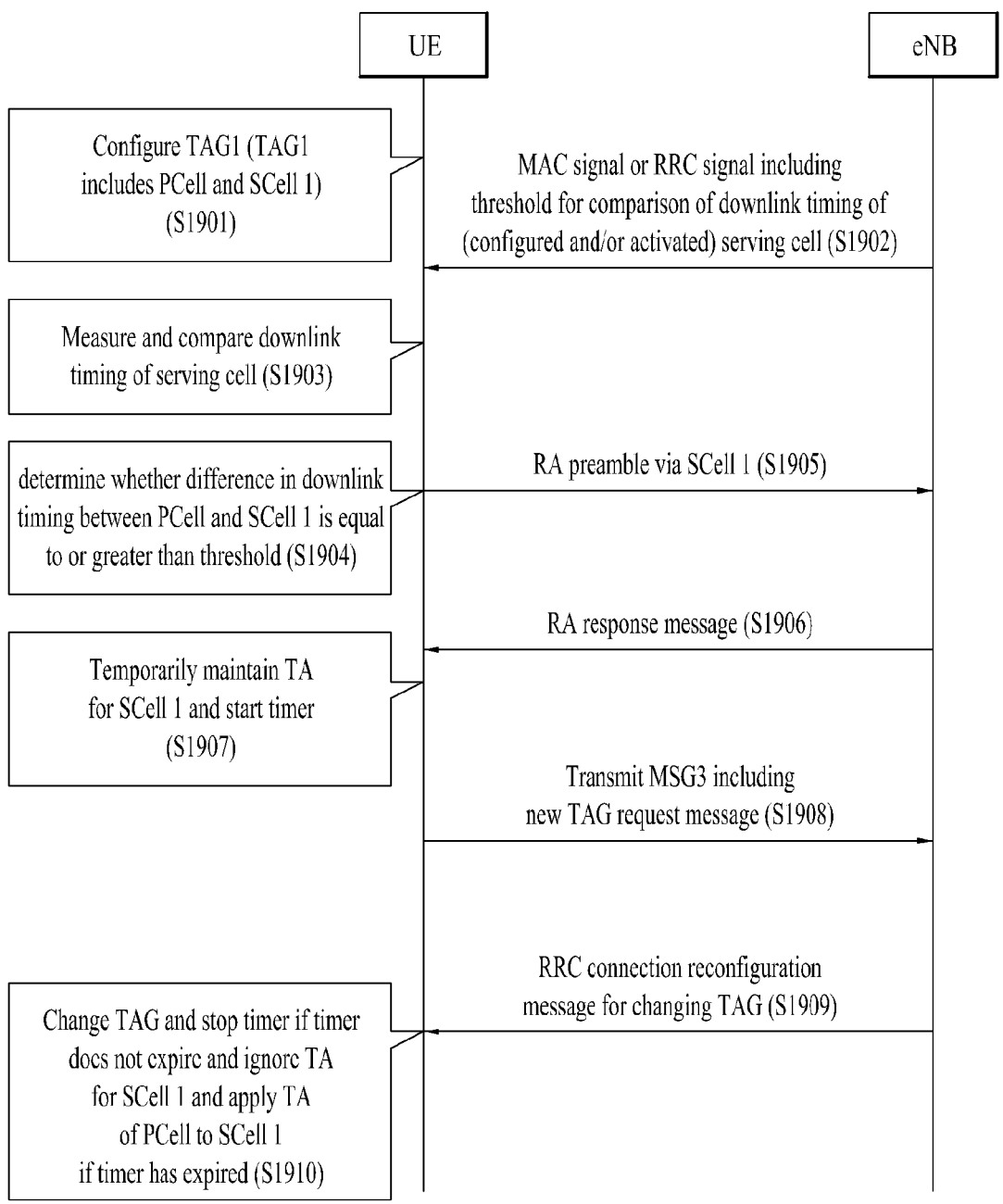
FIG. 19 is a diagram showing operation for controlling a timing advance group between a UE and an eNB according to an embodiment of the present invention.

FIG. 19 is a diagram showing operation for controlling a timing advance group between a UE and an eNB according to an embodiment of the present invention. In particular, FIG. 19 shows a method of changing a TAG of a serving cell to a new TAG.

Referring to FIG. 19, first, in step 1901, assume that a UE has one TAG, that is, TAG 1. Here, assume TAG 1 includes a PCell and an SCell 1.

In addition, an eNB transmits, to the UE, a threshold to be used for comparison of difference in downlink timing via a MAC signal or an RRC signal. The eNB also transmits, to the UE, information about a cell, the difference in downlink timing of which is compared. For example, differences in downlink timing of all or some of serving cells may be compared. At this time, the eNB informs the UE of a reference cell for comparison.

The UE measures downlink timings of the serving cells, obtains differences between the timings of the serving cells and the timing of the reference cell, and compares the differences with the threshold in step 1903. Upon downlink timing measurement, signals PSS and SSS for the downlink timing received from the eNB may be used.

If a difference in timing correction value between serving cells in TAG 1 is equal to or greater than a threshold in step 1904, the UE performs a random access procedure on the cell. That is, in the case in which it is assumed that the PCell is a reference cell, if the difference in timing correction value between the SCell 1 and the PCell 1 is equal to or greater than the threshold, the UE transmits a random access preamble to the eNB on the SCell 1 in step 1905. If the eNB has received the random access preamble, the eNB transmits a random access response RAR to the UE in step 1906. The eNB calculates the timing correction value via the random access preamble and informs the UE of the timing correction value via a timing command included in the RAR.

The UE temporarily maintains TA for the SCell 1 and starts a timer based on the timing command received via the RAR in step s1907. The timer may use a TAT value of the TAG or another value separately signaled from the eNB to the UE via an RRC signal.

In addition, the UE informs the eNB of the reason why the random access procedure is performed via a response message Msg3 to the RAR in step 1908 and requests the eNB to allocate a new TAG to the cell. The eNB, which has received Msg3, allocates a new TAG to the SCell 1 via an RRC connection reconfiguration message in step 1909.

In step 1910, the UE changes the TAG of the SCell 1 according to the RRC connection reconfiguration message and stops the timer if the timer of the SCell 1 is operating when the RRC connection reconfiguration message is received from the eNB. If the timer of the SCell 1 has expired, the UE ignores the current TAC and applies the timing value of the PCell to the SCell 1.

Figure 20:
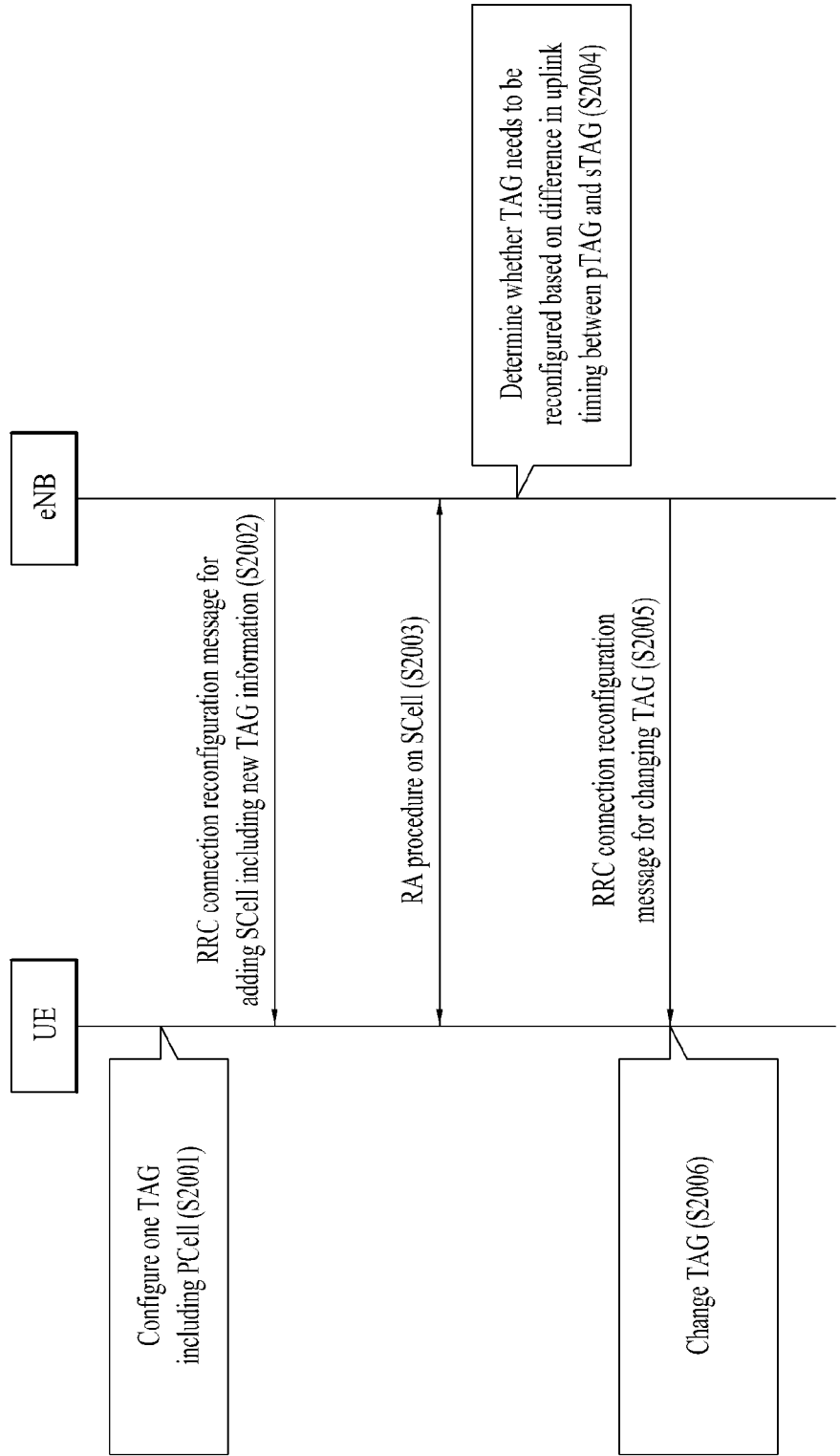
FIG. 20 is a diagram showing operation for controlling a timing advance group between a UE and an eNB according to an embodiment of the present invention.

FIG. 20 is a diagram showing operation for controlling a timing advance group between a UE and an eNB according to an embodiment of the present invention. In particular, FIG. 20 shows a method of changing a TAG of a serving cell according to a command of an eNB if the serving cell is additionally configured.

Referring to FIG. 20, assume that a UE has one TAG including a PCell in step 2001. In addition, assume that a TAG identifier known to the eNB and the UE is present and the PCell is a timing reference cell.

If the eNB needs to additionally configure a serving cell with respect to the UE, it is difficult to determine whether new timing is applied to the serving cell. Accordingly, the eNB may additionally configure the serving cell with respect to the UE via an RRC connection reconfiguration message and transmit new TAG information in step 2002. The TAG information may include identification of the TAG.

If the UE has added the serving cell via the RRC connection reconfiguration message and has received the new TAG information, the UE may perform a random access procedure on the serving cell in step 2003. While the eNB needs to transmit a separate command for performing a random access procedure in the related art, the separate command is not necessary in the present invention.

The eNB may measure a difference in uplink timing between a TAG including the PCell and a TAG including an SCell and determine that a TAG needs to be reconfigured in step 2004. If the eNB determines that the TAG needs to be reconfigured, the eNB may change the TAG with respect to the UE via the RRC connection reconfiguration message in step 2005. Accordingly, the UE changes the TAG of the serving cell in step 2006, when the RRC connection reconfiguration message for changing the TAG is received from the eNB.

In the present invention, in an environment in which a plurality of serving cells is grouped according to similarity of uplink timing change, a UE compares a downlink timing measurement value of a serving cell and a threshold set by an eNB, rapidly determines whether a TAG needs to be changed, and transmits a TAG change request to the eNB. Accordingly, it is possible to increase efficiency and accuracy when the eNB and the UE maintain and manage timing of the serving cell.

Figure 21:
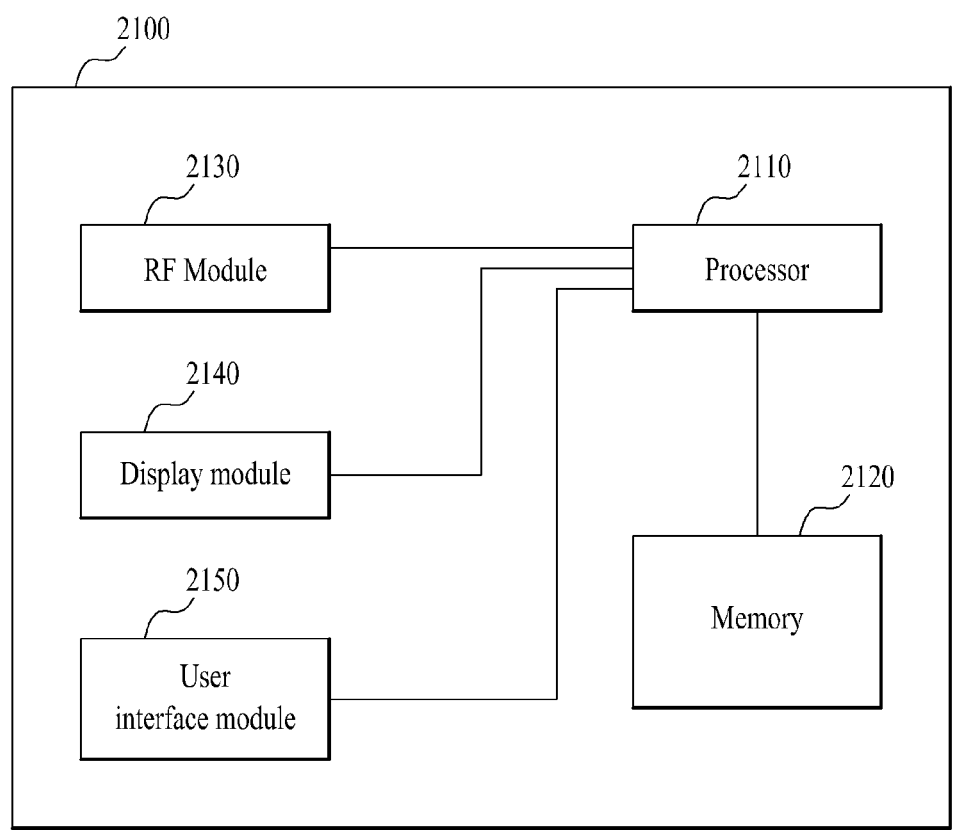
FIG. 21 is a block diagram showing the configuration of a communication apparatus according to an embodiment of the present invention.

FIG. 21 is a block diagram showing the configuration of a communication apparatus according to an embodiment of the present invention.

Referring to FIG. 21, the communication apparatus 2100 includes a processor 2110, a memory 2120, a Radio Frequency (RF) module 2130, a display module 2140 and a user interface module 2150.

The communication apparatus 2100 is shown for convenience of description and some modules thereof may be omitted. In addition, the communication apparatus 2100 may further include necessary modules. In addition, some modules of the communication apparatus 2100 may be subdivided. The processor 2110 is configured to perform an operation of the embodiment of the present invention described with respect to the drawings. For a detailed description of the operation of the processor 2110, reference may be made to the description associated with FIGS. 1 to 20.

The memory 2120 is connected to the processor 2110 so as to store an operating system, an application, program code, data and the like. The RF module 2130 is connected to the processor 2110 so as to perform a function for converting a baseband signal into a radio signal or converting a radio signal into a baseband signal. The RF module 2130 performs analog conversion, amplification, filtering and frequency up-conversion or inverse processes thereof. The display module 2140 is connected to the processor 2110 so as to display a variety of information. As the display module 2140, although not limited thereto, a well-known device such as a Liquid Crystal Display (LCD), a Light Emitting Diode (LED), or an Organic Light Emitting Diode (OLED) may be used. The user interface module 2150 is connected to the processor 2110 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method and apparatus for controlling timing advance at a user equipment (UE) in a wireless communication system to a 3GPP LTE system is described, the present invention is applicable to various wireless communication system other than the 3GPP LTE system.

The invention claimed is:

1. A method of controlling a timing group at a user equipment (UE) in a wireless communication system, the method comprising:
measuring a difference in downlink timing between a specific serving cell and a reference cell; and
transmitting a timing group change request message to a network, if the specific serving cell belongs to the same timing group as the reference cell and the measured difference in downlink timing is equal to or greater than a threshold or if the specific serving cell belongs to a timing group different from that of the reference cell and the measured difference in downlink timing is less than the threshold.

2. The method according to claim 1, further comprising receiving a message for changing the specific serving cell to another timing group in response to the timing group change request message if the specific serving cell belongs to the same timing group as the reference cell and the measured difference in downlink timing is equal to or greater than the threshold.

3. The method according to claim 1, further comprising receiving a message for changing the specific serving cell to the same timing group as the reference cell in response to the timing group change request message if the specific serving cell belongs to a timing group different from that of the reference cell and the measured difference in downlink timing is less than the threshold.

4. The method according to claim 1, wherein the reference cell is a primary serving cell.

5. The method according to claim 1, wherein the reference cell is a secondary serving cell configured by the network.

6. The method according to claim 1, further comprising receiving information about the threshold from the network.

7. A method of controlling a timing group at a user equipment (UE) in a wireless communication system, the method comprising:
measuring a difference in downlink timing between a reference cell and a specific serving cell belonging to the same timing group as the reference cell;
transmitting a random access preamble message to a network if the difference in downlink timing is equal to or greater than a threshold; and
receiving a random access response message including a timing correction value for the specific serving cell from the network.

8. The method according to claim 7, further comprising:
transmitting a timing group change request message of the specific serving cell to the network after applying the timing correction value; and
receiving a timing group change message for allocating the specific serving cell to a new timing group in response to the timing group change request message.

9. The method according to claim 7, further comprising applying uplink timing of the reference cell to uplink timing of the specific serving cell if the timing group change message is not received for a predetermined time after transmitting the timing group change request message.

* * * * *